United States Patent
Haygood et al.

(12) 
(10) Patent No.: US 6,537,646 B2
(45) Date of Patent: Mar. 25, 2003

(54) UPHOLSTERY FABRIC TACK STRIPS AND METHODS OF MAKING SAME

(76) Inventors: David L. Haygood, 1260 County Rd. 175, Florence, AL (US) 35634; Gary T. Schwertner, 300 Rock Crusher Rd., St. Joseph, TN (US) 38481

( * ) Notice: Subject to any disclaimer, the term of this patent is extended or adjusted under 35 U.S.C. 154(b) by 0 days.

(21) Appl. No.: 09/876,229

(22) Filed: Jun. 8, 2001

(65) Prior Publication Data

US 2002/0187301 A1 Dec. 12, 2002

(51) Int. Cl.[7] ................................................. B32B 3/10
(52) U.S. Cl. ........................ 428/132; 428/133; 428/134; 470/158
(58) Field of Search ............................... 4/16; 470/158; 428/36.9, 132, 133, 134; 411/466; 16/16

(56) References Cited

U.S. PATENT DOCUMENTS 5,613,817 A * 3/1997 Bush et al. .................. 411/466
5,956,804 A * 9/1999 Dunne ............................ 16/16

* cited by examiner

Primary Examiner—Harold Pyon
Assistant Examiner—Jane Rhee
(74) Attorney, Agent, or Firm—Nixon & Vanderhye P.C.

(57) ABSTRACT

An upholstery tack strip includes a thermoplastic sleeve and a metal ribbon embedded within the sleeve. The sleeve itself includes a plurality of removed material sections forming opposed pairs of sleeve windows, while the metal ribbon integrally includes nail sections which protrude outwardly from the tack strip through respective ones of the sleeve windows. Most preferably, the sleeve is extrusion-coated onto the metal ribbon stock using a cross-head die. The thus-coated metal strip preform may then be transferred to downstream fabrication operations whereby the sleeve windows and nail portions are formed. Since the nail portions protrude outwardly from the tack strip through the sleeve windows, relative lengthwise slippage between the metal ribbon stock and the sleeve is prevented.

8 Claims, 5 Drawing Sheets

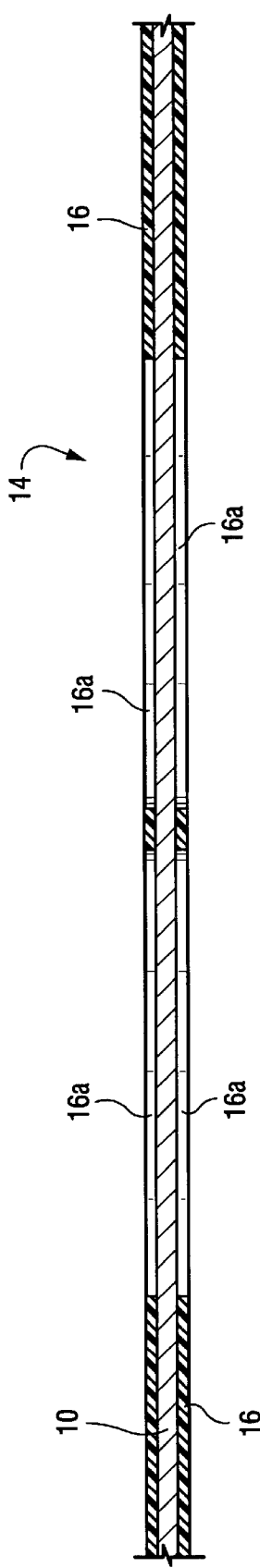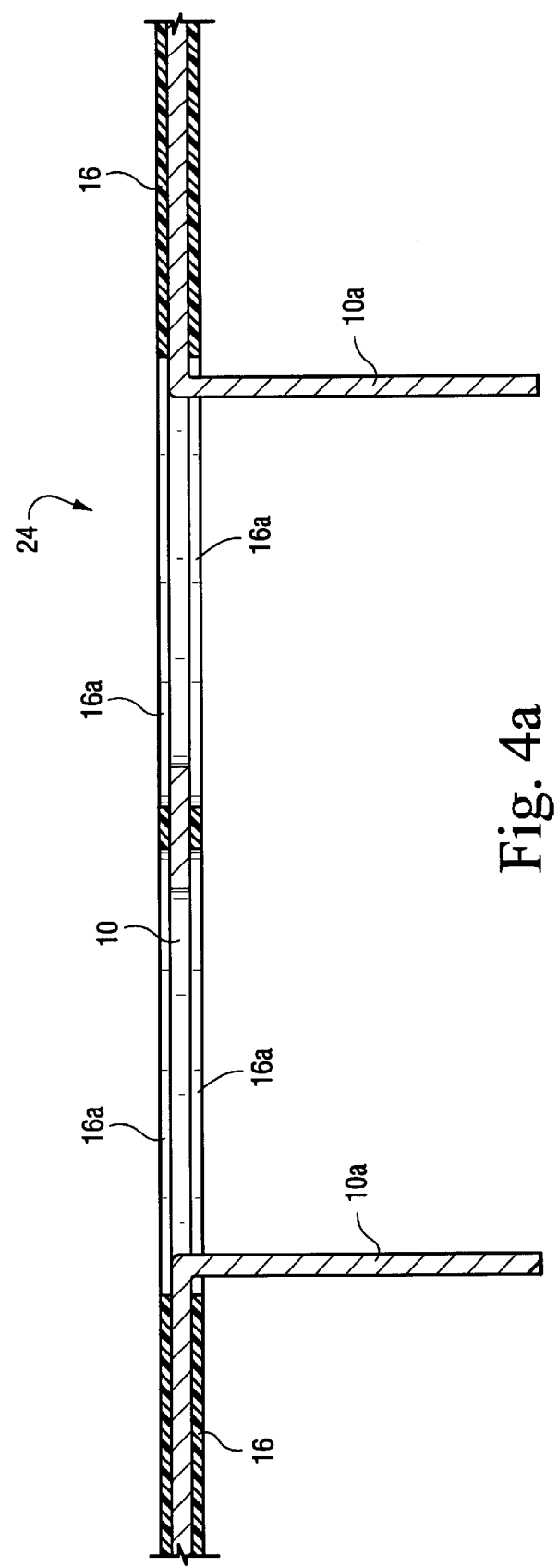

UPHOLSTERY FABRIC TACK STRIPS AND METHODS OF MAKING SAME

FIELD OF THE INVENTION

The present invention relates generally to the field of upholstery fabric tack strips and methods of making the same, especially tack strips that are used to attach upholstery fabric to an underlying furniture frame member.

BACKGROUND AND SUMMARY OF THE INVENTION

Conventional upholstery tack strips are made from flat metal (e.g., metal) ribbons by a punch-press operation. Specifically, generally triangularly-shaped nails are formed by punching out correspondingly shaped, partially cut-out sections from the metal ribbon at spaced-apart locations along the ribbon's length and then bending the sections so each is at substantially a right angle relative to the ribbon stock. Thus, the nails remain unitarily attached to the metal ribbon, but project outwardly therefrom.

In use, the metal from which conventional tack strips are made can physically mar and/or abrade the upholstery fabric. For example, the ribbon, if formed from metal, may rust over time which might in turn visibly discolor the fabric. Furthermore, the edges of the metal tack strip may abrade or cut the upholstery fabric. In order to prevent such problems, it has been conventional practice to provide upholstery tack strips with a separate C-shaped plastic sleeve which slides over the tack strip along its length. The plastic sleeve, however, is itself problematic in that it involves a separate manufacturing step to slideably mate it with the tack strip. Furthermore, unless some means are provided to restrict relative lengthwise movement between the metal tack strip and the sleeve, the latter can become separated from the former during use and/or installation.

What has been needed therefore are upholstery tack strips that minimize, if not eliminated entirely, the problems noted above. It is towards providing solutions to such problems that the present invention is directed.

According to the present invention, upholstery tack strips are provided which include a thermoplastic sleeve and a metal ribbon embedded within the sleeve. The sleeve itself includes a plurality of removed material sections forming opposed pairs of sleeve windows, while the metal ribbon integrally includes nail sections which protrude outwardly from the tack strip through respective ones of the sleeve windows. Most preferably, the sleeve is extrusion-coated onto the metal ribbon stock using a cross-head die with a screw extruder. The thus-coated metal strip preform may then be transferred to downstream fabrication operations whereby the sleeve windows and nail portions are formed. Since the nail portions protrude outwardly from the tack strip through the sleeve windows, relative lengthwise slippage between the metal ribbon stock and the sleeve is prevented.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 3a is an enlarged cross-sectional view of the tack strip preform as taken along line 3a—3a in FIG. 3;

FIG. 4a is an enlarged cross-sectional view of the finished tack strip as taken along line 4a—4a in FIG. 4.

DETAILED DESCRIPTION OF THE INVENTION

Figure 1:
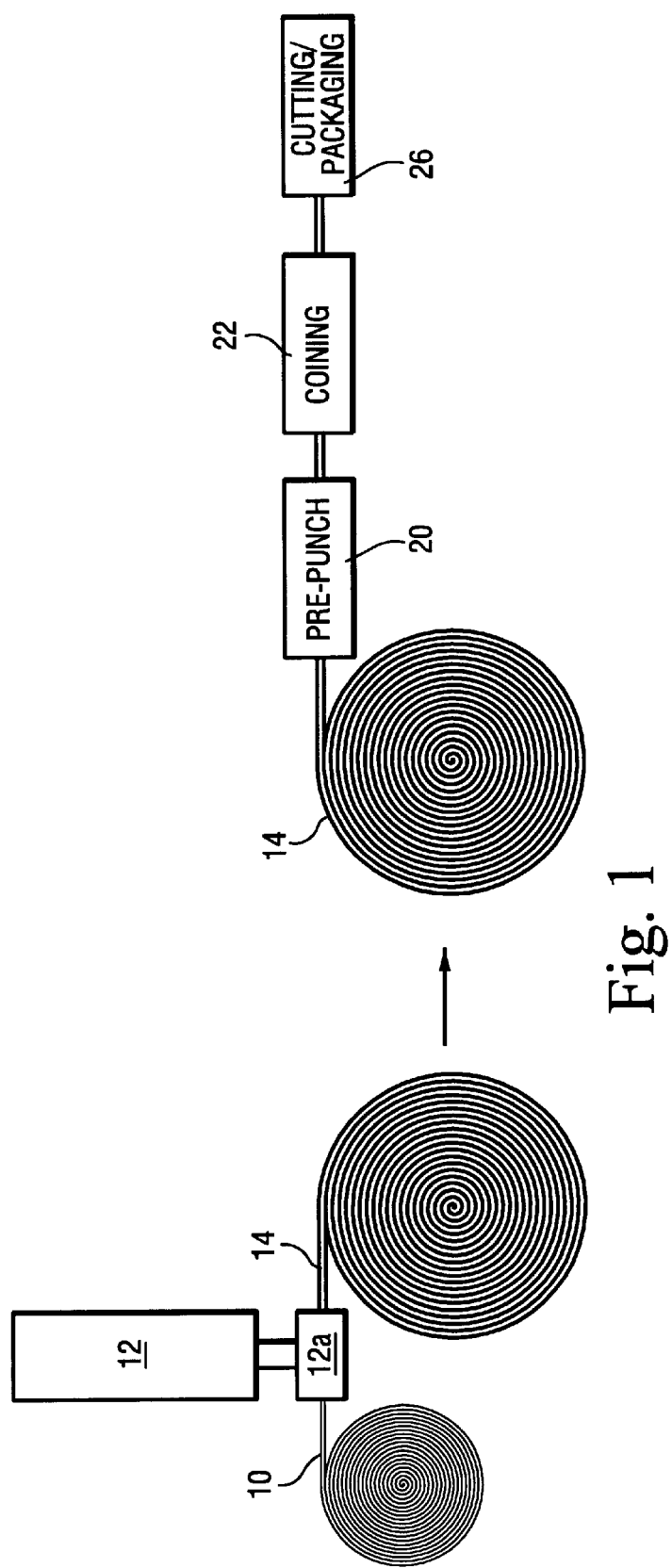
FIG. 1 is a schematic view showing a possible manufacturing sequence in accordance with the present invention.
Figure 2:
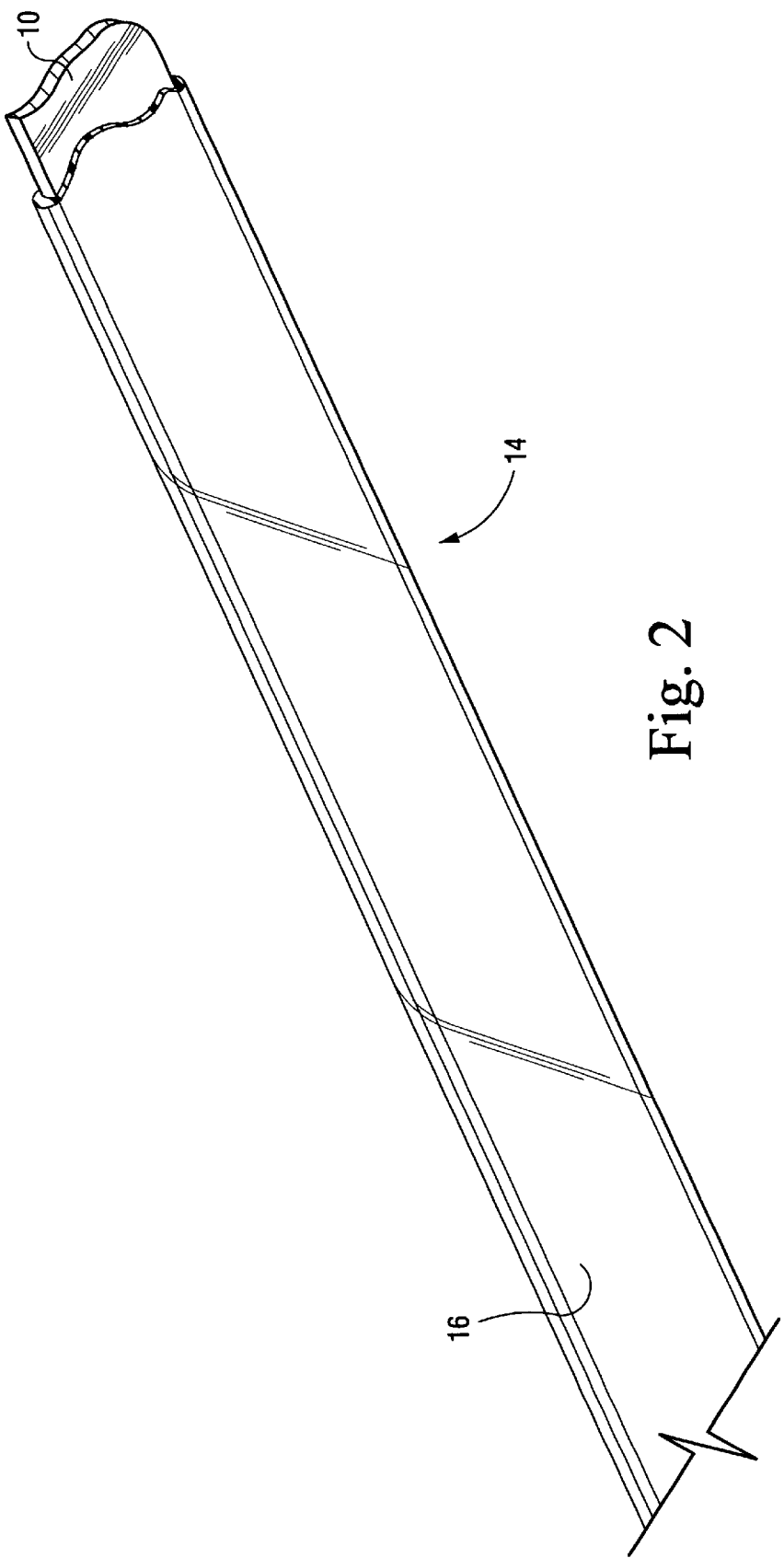
FIG. 2 is a perspective view showing a coated strip preform that is made in accordance with the present invention.

Accompanying FIG. 1 depicts one possible manufacturing sequence for making the upholstery tack strip of the present invention. IN this regard, a roll of metal strip or ribbon stock 10 may be fed to and through the cross-head die 12a associated with screw extruder 12. As is well known, thermoplastic pellets may be fed into the hopper (not shown) of the screw extruder 12. The extruder 12 thus forms a molten stream of the thermoplastic material which is fed into the cross-head die 12a. Upon cooling, therefore, the thermoplastic material is thereby coated onto the metal ribbon stock 12 so as to form a composite strip preform 14. Specifically, as shown in FIG. 2, the preform 14 includes a core of the metal ribbon stock 10 which is embedded with, and thus coated entirely by, a sleeve 16 formed of solidified thermoplastic material (i.e., the solidified residue of the thermoplastic material applied in its molten state by the cross-head die 12a). Virtually any thermoplastic material may be employed in accordance with the present invention. Preferred thermoplastic materials include polyolefins (e.g., polyethylene and polypropylene), nylons, polyesters, polyvinyl chlorides and the like.

Figure 3:
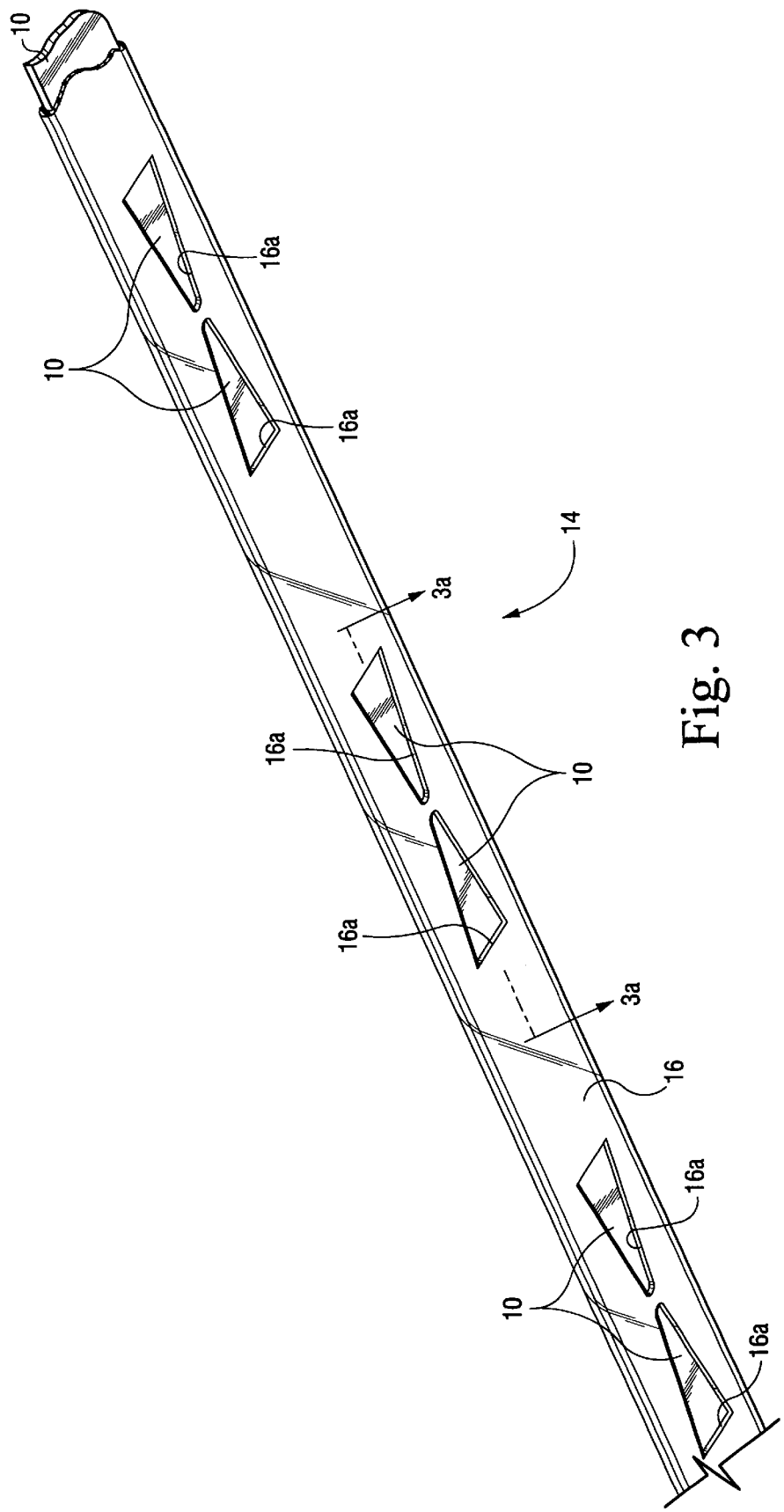
FIG. 3 is a perspective view similar to the preform of FIG. 2 but showing the windows which are subsequently formed in the plastic coating material of the integral sleeve thereof.

The composite strip preform 14 may be formed into a roll and then used as a feed for a pre-punch operation 20 as shown in FIG. 1. Alternatively, the composite strip preform 14 may be fed continuously from the cross-head die 12a to the pre-punch operation 20. During the pre-punch operation, as shown in accompanying FIGS. 3 and 3a, opposed sections of the sleeve 16 are removed at lengthwise separated locations along the preform 14 so as to form windows 16a through which corresponding opposed surface portions of the encased metal ribbon 10 are exposed. As is perhaps better shown in FIG. 3a, a registered pair of such windows 16a is formed on both the upper and lower surfaces of the sleeve 16.

Figure 4:
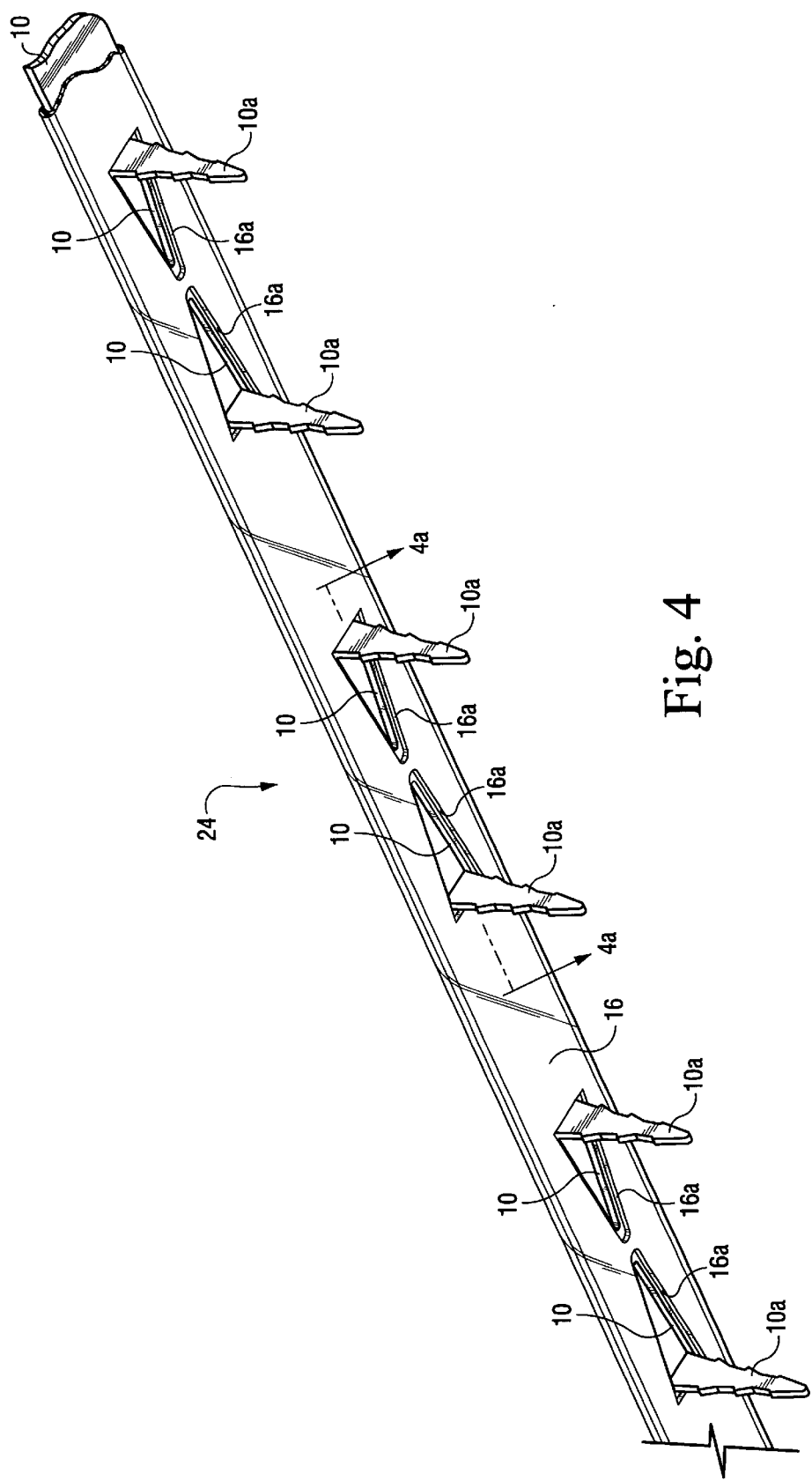
FIG. 4 is a perspective view similar to FIGS. 2 and 3 showing the finished tack strip in accordance with the present invention.

The purpose of the registered pairs of opposed windows 16a is to allow the nail-forming punch dies in the coining/punching operation 22 to bear directly against the upper and lower surfaces metal strip 10. Thus, the size of the windows 16a is larger than the foot print of the nail-forming dies in the coining/punching operation 22. As with conventional tack strips, therefore, the coining/punching operation 22 serves to punch out generally triangularly shaped nails 10a from the metal ribbon 10 and bend them at substantially right angles thereto as shown in accompanying FIGS. 4 and 4a. The finished tack strip 24 in accordance with the present invention may then be cut into desired lengths (e.g., from about 3 inches in length up to about 48 inches in length), packaged and shipped in operation 26 as shown in FIG. 1.

As can be appreciated, since the sleeve 16 is formed as an integral extruded member which embeds the metal ribbon stock 10, it does not need to be installed during a separate operation. Furthermore, the formation of the nails 10*a* will necessarily prevent any relative lengthwise movements from occurring between the metal ribbon stock 10 and the sleeve 16.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An upholstery tack strip comprising a thermoplastic sleeve and a metal ribbon embedded within said sleeve, wherein said metal ribbon integrally includes a plurality of longitudinally spaced-apart nail sections which protrude outwardly from said tack strip, and wherein said sleeve includes a plurality of removed material sections forming a plurality of opposed pairs of individual sleeve windows each in registry with a respective one of said nail sections, and wherein said nail sections protrude outwardly from said tack strip through respective ones of said sleeve windows and thereby prevent lengthwise slippage of said sleeve relative to said metal ribbon.

2. The upholstery tack strip as in claim 1, wherein the opposed pairs of sleeve windows are generally triangularly shaped.

3. The upholstery tack strip as in claim 2, wherein said nail sections are generally triangularly shaped, and wherein said respective ones of said sleeve windows are larger as compared to the nail sections which protrude therethrough.

4. The upholstery tack strip as in claim 1, wherein said sleeve is formed of a thermoplastic material.

5. The upholstery tack strip as in claim 4, wherein the thermoplastic material is selected from the group consisting of polyolefins, nylons, polyesters, and polyvinyl chlorides.

6. An upholstery tack strip comprising a metal ribbon, and a thermoplastic sleeve surrounding said metal ribbon, wherein said metal ribbon integrally includes a longitudinal spaced-apart series of generally triangular nail sections which are formed by punching a corresponding triangular region from said metal ribbon and bending said triangular region generally perpendicularly to said metal ribbon, and wherein said thermoplastic sleeve includes individual generally triangularly shaped windows associated with each of said nail sections, wherein each of said nail sections protrude outwardly from said tack strip through a respective one of said windows to thereby prevent lengthwise slippage of said sleeve relative to said metal ribbon.

7. An upholstery tack strip comprising:

a metal ribbon; and a thermoplastic sleeve surrounding said metal ribbon, said sleeve having a plurality of individual windows disposed along a lengthwise extent of said ribbon; wherein said ribbon includes a plurality of nail sections along said lengthwise extent thereof which protrude outwardly from said ribbon through respective ones of said windows to thereby prevent slippage of said sleeve along said lengthwise extent of said ribbon.

8. The upholstery tack strip of claim 7, wherein each of said nail sections and windows is generally triangularly shaped.

\* \* \* \* \*